(No Model.)

W. T. DOREMUS.
BLANK CHECK, DRAFT, MONEY ORDER, OR SIMILAR INSTRUMENT.

No. 490,951. Patented Jan. 31, 1893.

WITNESSES:
Chas. Niola
Co. Sedgwick

INVENTOR
W. T. Doremus
BY
Munn & Co
ATTORNEYS.

United States Patent Office.

WILLIAM T. DOREMUS, OF FLATBUSH, NEW YORK.

BLANK CHECK, DRAFT, MONEY-ORDER, OR SIMILAR INSTRUMENT.

SPECIFICATION forming part of Letters Patent No. 490,951, dated January 31, 1893.

Application filed July 7, 1892. Serial No. 439,197. (No model.)

*To all whom it may concern:*

Be it known that I, WILLIAM T. DOREMUS, of Flatbush, in the county of Kings and State of New York, have invented a new and useful Improvement in Blank Checks, Drafts, Money-Orders, or other Similar Instruments, of which the following is a full, clear, and exact description.

My invention relates to improvements in checks, drafts, or other money orders or instruments in which a sum of money is directed to be paid and requires the signature of the maker of the instrument, or on the face of which the amount or quantity of something other than money is expressed.

To simplify description however, the invention will here be illustrated as applied to a bank draft, check or other like money order.

The invention is an improvement on the blank draft, check, or other money order or instrument for which Letters Patent, No. 416,655 were issued to me April 12, 1892, and which was an improvement on the blank draft, check, or other money order or instrument for which Letters Patent No. 376,949 were issued to me January 24, 1888.

The object of both of these patented inventions, as also the object of the present invention, is to prevent the changing, altering or raising of the check, draft or other instrument without detection, to which end the instrument is made with spaces, numerals and words or lines so arranged as to admit of its being filled out in such manner as to prevent it from being raised or made to represent a larger sum than that for which it was drawn, and whereby the signature can readily be combined with figures expressive of the denomination and amount so as to represent exactly or within certain limits the sums for which the instrument was given. In such instruments, it is necessary, in order to alter or raise the money value of the document, not only that the amount as written out on the face of the instrument or the sum of largest denomination expressed should be raised and a different amount be written over the erasure, but also that the signature to the instrument, which if desired may be written in more than one line or space to give increased protection, should also be erased and be rewritten to correspond, and in the money order or instrument patented to me on April 12, 1892, hereinbefore referred to, which provided for the instrument being more easily, quickly and correctly filled up and upon which the present invention is more particularly designed as an improvement, an additional protection was provided by forming the instrument with a stub-like extension on its one end on which are indicated on lines or in spaces running transversely of the instrument, notation characters indicative of different denominations or successive figures in a large or small sum, and which are separately detachable or capable of being torn off as coupons to show on the balance of the remaining portion of the stub the number and order of the figures in the sum expressed on the face of the instrument.

My present invention more especially relates to this feature and consists in providing a stub-like extension on the end of the instrument, having well defined spaces in each coupon division of the stub adapted to contain a separate figure of the sum in regular order, which will facilitate the writing of the signature under the proper numerals on the face of the instrument to signify the amount, and will serve as a readily discernable check on the amount by placing the sum as expressed in figures in places which indicate their denomination.

The invention also comprises, in connection with the longitudinal spaces or lines on the face of the check having consecutive numbers in a portion of them, dividing cross lines extending between the numbers, arranged to stop short of the space or spaces left for the signature or signatures, whereby the signing of the instrument is not interrupted or interfered with as where said cross lines intersect both the numerical and signature spaces, substantially as hereinafter described.

Reference is to be had to the accompanying drawings forming a part of this specification, in which similar letters of reference indicate corresponding parts in both views.

Figure 1 is a face view of a blank check of the character described, embodying my invention, and before the same is filled up; and Fig. 2 is a like view of the same check after it has been filled up and certain coupons at its end detached.

I have here only shown the check having a stub-like extension at its one end, containing five coupon divisions or spaces adapted to contain not more than five figures in the sum, that is, one figure each, but as there is no limit to the amount for which the check may be drawn, said stub-like extensions may be made with any greater or lesser number of coupon divisions or spaces.

A, indicates the check which may have the usual form of heading, space left for date, and blank space $b$ for name of the payee. The name of the place where the check is drawn, as also the name of the drawee may, if desired, be left in blank. Below the space or line $b$ are the parallel longitudinal spaces or "lines" as they may be termed C, as in my former patented money orders or instruments hereinbefore referred to, said lines or spaces serving to receive above, in writing, the amount for which the check is drawn, and below, that is, in one or more of the lower lines or spaces, the signature of the maker of the check. Thus, the check is represented as drawn for two hundred and fifty seventy-five one hundredths dollars, and this is written on or immediately over an upper one of the longitudinal lines or spaces C, having numeral divisions, $e$, for a portion of its length at least, produced by vertical or cross lines $d$, and here shown as numbered respectively 0, 1, 2, 3, 4, 5, 6, 7, 8 and 9. The figure of highest denomination in the sum is commenced to be written immediately over the number corresponding thereto; thus the word "two" in the sum is commenced to be written over the numeral 2 in the one of said divisions $e$, and the signature of the maker of the check commenced to be written under said numeral 2, in the next longitudinal space C below. If the signature is repeated, it should commence in the next lower longitudinal space C, under the numeral in a division $e$ corresponding to the figure of the next highest denomination in the sum; thus it is commenced to be written under the division $e$ marked 5, and the same feature may be extended or carried out if desired, by further signing, to all the figures in the sum. This has all been explained before in my former patents hereinbefore referred to, and serves to make the check safe as against being raised, by identifying the amount with or by the signature of the maker. But in my former patented checks, the vertical or transverse lines $d$ were run across the several parallel horizontal lines or spaces C, which interfered with or interrupted the signing of the maker's name, whereas by the arranging of said vertical or cross lines $d$, which serve to locate the numbered spaces $e$ for commencement of the written amount and maker's signature in their proper places, on or intersecting the upper numbered horizontal space or "line" C only, with it may be small marks or crosses $d'$ on the spaces or lines C beneath in line with said lines $e$, a clear and uninterrupted space is left for the writing of the maker's signature or signatures, which will be less liable to confuse.

D, indicates the stub-like extension on the end of the check proper, divided, it may be by lines $f$ running transversely of the check, into independent coupons having each a separate and well defined space $s$, of any suitable shape, adapted to contain a single figure of the sum in regular order, the first coupon division containing in its space $s$, the figure of highest denomination in the sum, the space $s$ in the second coupon division the next figure of highest denomination, and so on throughout the stub-like extension D. By thus writing in numerals the amount of the sum in the coupon spaces $s$, instead of writing it in figures or numerals elsewhere on the face of the check, a clearer exposure of the sum, less liable to alteration, and corresponding with the written amount on the face of the check, is made. This will not only help the proper filling up of the check, but on tearing off unfilled coupons, leaving only the coupons attached which express the amount of the check, as shown at the right hand of Fig. 2, an additional security is afforded against the raising of the check; thus the coupons left attached, after the check illustrated in the drawings has been filled up, show the amount of the check, omitting the fractions seventy-five cents, namely, two hundred and fifty dollars.

Having thus described my invention, I claim as new, and desire to secure by Letters Patent,—

A blank check, draft, money order or similar instrument, of the character described, having on its face longitudinal spaces or lines with consecutive numbers applied to an upper one of said spaces or lines, and provided with a stub-like extension D at its end, divisible into separate coupons each of which is provided with a well defined space $s$, adapted to contain a single figure in the sum of the instrument, and two or more of which combined serve to contain in regular order the different figures in the entire sum, or mainly so, essentially as described.

WILLIAM T. DOREMUS.

Witnesses:
A. GREGORY,
C. SEDGWICK.